United States Patent
Barrau

(10) Patent No.: US 12,523,473 B2
(45) Date of Patent: Jan. 13, 2026

(54) METHOD FOR ASSISTING WITH THE NAVIGATION OF A VEHICLE

(71) Applicant: SAFRAN, Paris (FR)

(72) Inventor: Axel Barrau, Moissy-Cramayel (FR)

(73) Assignee: SAFRAN, Paris (FR)

( * ) Notice: Subject to any disclaimer, the term of this patent is extended or adjusted under 35 U.S.C. 154(b) by 109 days.

(21) Appl. No.: 18/566,542

(22) PCT Filed: Jun. 3, 2022

(86) PCT No.: PCT/FR2022/051065
§ 371 (c)(1),
(2) Date: Dec. 1, 2023

(87) PCT Pub. No.: WO2022/254163
PCT Pub. Date: Dec. 8, 2022

(65) Prior Publication Data
US 2024/0263947 A1    Aug. 8, 2024

(30) Foreign Application Priority Data
Jun. 4, 2021   (FR) .................................. FR2105894

(51) Int. Cl.
*G01C 21/16*   (2006.01)
*G01S 19/38*   (2010.01)

(52) U.S. Cl.
CPC ................... *G01C 21/165* (2013.01)

(58) Field of Classification Search
CPC .......... G01C 21/16; G01C 21/10; G01S 19/38
See application file for complete search history.

(56) References Cited

U.S. PATENT DOCUMENTS

| | | | | |
|---|---|---|---|---|
| 5,001,647 A | * | 3/1991 | Rapiejko | G01C 21/188 708/607 |
| 10,345,427 B2 | | 7/2019 | Barrau et al. | |
| 2009/0037107 A1 | * | 2/2009 | Huddle | G01C 25/005 701/510 |
| 2009/0265104 A1 | * | 10/2009 | Shroff | G01S 19/47 701/472 |
| 2013/0338915 A1 | * | 12/2013 | Mizuochi | G01C 25/005 701/500 |
| 2014/0341465 A1 | | 11/2014 | Li et al. | |
| 2017/0314928 A1 | | 11/2017 | Perrot | |
| 2018/0340779 A1 | * | 11/2018 | Faulkner | G01C 21/188 |

FOREIGN PATENT DOCUMENTS

WO    WO 2016/156602 A1    10/2016

* cited by examiner

*Primary Examiner* — Tan Q Nguyen
(74) *Attorney, Agent, or Firm* — BIRCH, STEWART, KOLASCH & BIRCH, LLP

(57) ABSTRACT

The invention relates to a method, navigation device and computer program product for assisting with the navigation of a vehicle provided with a navigation device. The method comprises the following steps: acquiring a priori values of variables of a navigation device of the vehicle; determining current values of the variables and a current uncertainty matrix from previous values of the variables and a previous uncertainty matrix; and determining a correction from the current values of the variables, the current uncertainty matrix and a measurement.

17 Claims, 3 Drawing Sheets

[Fig.1]
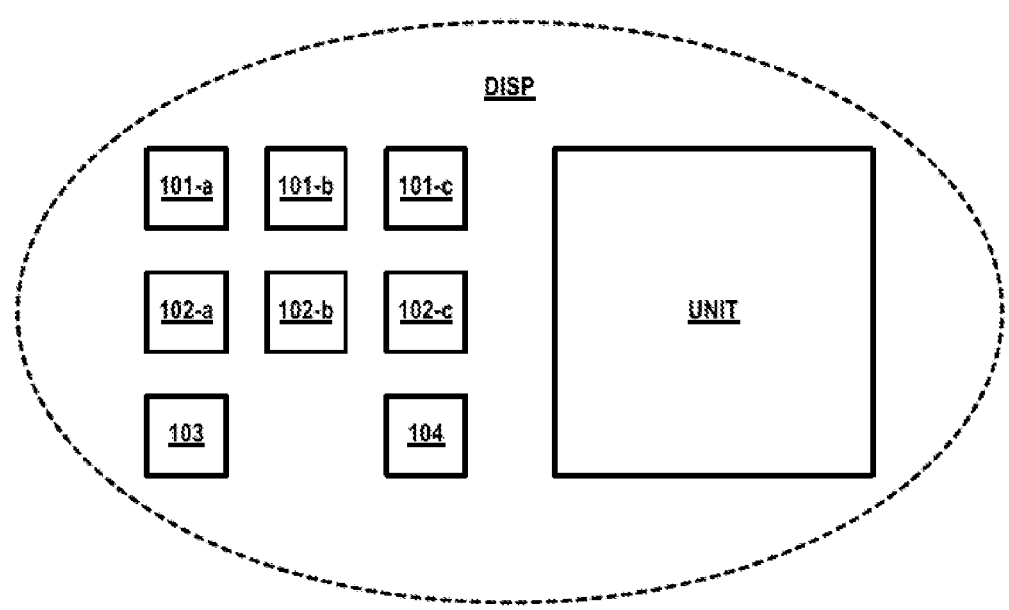

[Fig.2]
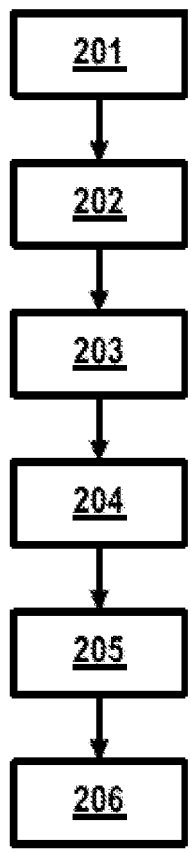
[Fig.3]
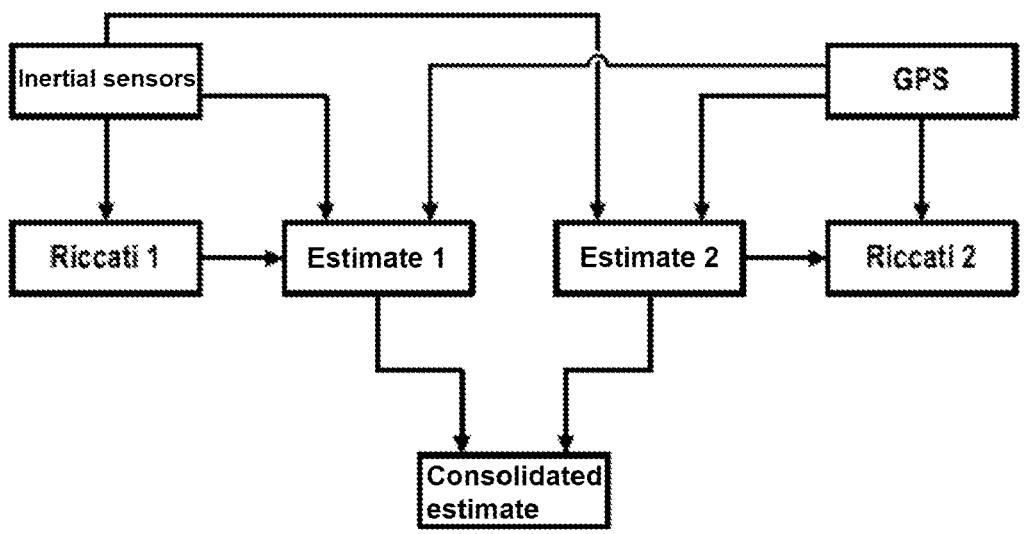

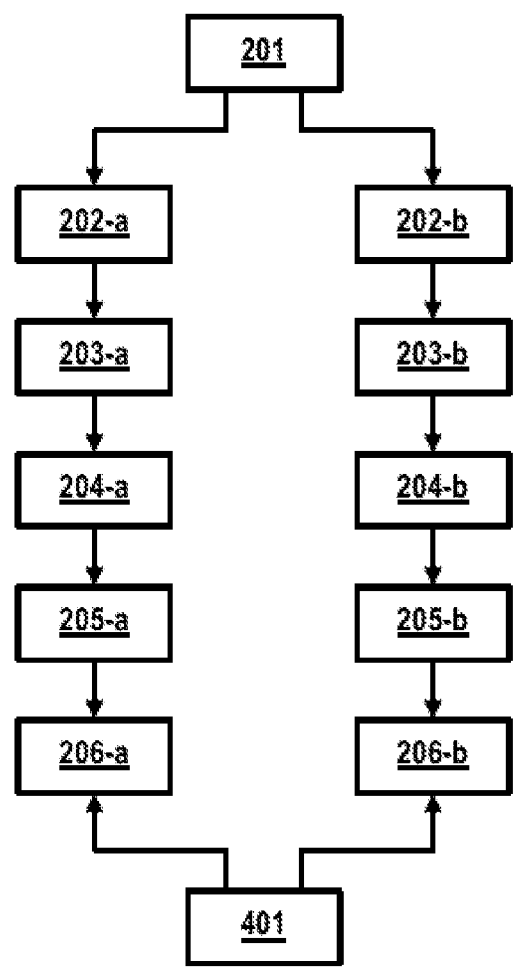
[Fig.4]

METHOD FOR ASSISTING WITH THE NAVIGATION OF A VEHICLE

FIELD OF THE INVENTION

This invention relates to the field of methods for navigation of a vehicle. It more specifically relates to so-called hybrid navigation methods.

PRIOR ART

Hybrid navigation methods are methods in which measurements from several sensors (accelerometers, gyroscopes, GPS, etc.) are fused to determine variables representative of a state of a device implementing the method.

These variables comprise kinematic variables which are, for example, a position, a velocity or a matrix of orientation of the device representing the change of coordinates from a mobile frame of reference attached to the bearer to a reference frame of reference.

These variables also comprise sensor fault variables, the value of which is representative of faults on the measurement of one or more sensors (for example a bias or an incorrect positioning of the sensor).

In the remainder of the text the term "variables" interchangeably denotes the kinematic variables and the sensor fault variables.

These methods use main measurements which are measurements of motion, for example inertial measurements, such as those obtained from accelerometers and gyroscopes. Accelerometers and gyroscopes are used to obtain the specific force and the angular velocity. The specific force is the sum of the external forces other than gravitational ones divided by the mass. This quantity thus has the dimension of an acceleration.

These methods also use additional measurements which can come from another sensor (GPS, odometer, etc.) or an algorithm used to detect the stopping of the device. In the latter case the velocity of the vehicle is detected as zero by an algorithm, or indicated as zero by the user, and not actually measured, but this does not affect the operation of the navigation method and in this document the stop detection will be referred to as a velocity "measurement". These additional measurements are fused with the main measurements to determine the kinematic variables.

Hybrid navigation methods use a conventional extended Kalman filter. This filtering is characterized by propagation steps using the main measurements and by update steps using the additional measurements. The extended Kalman filter maintains estimated values of the variables of the system and a so-called covariance matrix $P_n$, evaluating the uncertainty on the estimated values. This uncertainty is defined as the covariance of an error variable $e^x$ defined as $e^x = X - \hat{X}$ where $\hat{X}$ is the estimate of one of the vector variables and where X is the actual value of this vector variable. Since of the kinematic variables is, in general, an orientation represented by a rotation matrix (therefore a non-vector variable), the formula above cannot be used for the orientation which is not represented by a vector but, in general, by a unit quaternion or an orientation matrix and a rotation error variable $e^T$ is defined by the formula $R(e^T) = T\hat{T}^t$ or $R(e) = \hat{T}^t T$, $R(\cdot)$ denoting the function returning a rotation matrix based on a rotation vector, T denoting the orientation matrix, $\hat{T}$ the estimated value of this matrix and the symbol $M^t$ denoting the transposition of a matrix M.

However the conventional extended Kalman filter is not capable of correcting large estimation errors and it requires a prior so-called alignment phase.

The invariant Kalman filter is known, in which particular error variables are used to obtain better performance with certain non-linear systems (in particular for navigation). For a vector X written in a given frame of reference and an orientation matrix T representing the change in coordinates from a mobile frame of reference attached to the bearer to the given frame of reference used to write the vector X. These so-called "invariant" error variables are of two types:

Left-invariant error variables in this given frame of reference:

$$R(e^T) = \hat{T}^t T, e^X = \hat{T}^t(X - \hat{X})$$

Right-invariant error variables in this given frame of reference:

$$R(e^T) = T\hat{T}^t, e^X = X - T\hat{T}^t\hat{X}$$

However the performance of the invariant Kalman filter is ensured by theoretical properties solely when all the variables it estimates are defined in the same frame of reference. If it simultaneously estimates values defined in different frame of references such as an inertial frame of reference and a frame of reference attached to the bearer, it can lose consistency. The term "consistency loss" is used when the actual estimation errors committed by the filter are significantly greater than the uncertainties defined by the covariance matrix computed by the filter. Such is the case when certain values, such as the position or the velocity of the device, are defined in a frame of reference (for example a geocentric frame of reference) whereas other values, such as faults on one or more sensors, are defined in a mobile frame of reference (for example centered on the device). In addition, the particular error variables used by an invariant Kalman filter are sometimes sources of numerical instabilities, in the sense that the estimated variables move gradually away from their expected value because of the approximations made by the computer during arithmetic operations on floating numbers.

There is therefore a need for a new type of navigation method which makes it possible to estimate the state of a system in a consistent and numerically stable way, this state comprising values defined in different frame of references.

SUMMARY OF THE INVENTION

In this regard, the invention makes provision, according to a first aspect, for a method of assistance with the navigation of a vehicle, the method comprises the following steps:
  capture of a priori values of variables of a device for navigation of the vehicle,
  determination of current values of the variables and of a current uncertainty matrix, based on preceding values of the variables and on a preceding uncertainty matrix,
  determination of a correction based on:
    the current values of the variables,
    the current uncertainty matrix and
    a measurement, update of the current values and of the current uncertainty matrix based on the correction and on the current uncertainty matrix, first transformation of the current uncertainty matrix to obtain a modified uncertainty matrix, the first transformation being a first error variable change according to a first linearization point and second transformation of the modified uncertainty matrix, the second transformation being a second error variable change according to a second linearization point.

The first linearization point is different from the second linearization point.

Thus, this method makes it possible to determine the value of the variables of the navigation device. These variables are kinematic variables and sensor fault variables. This method can thus determine variables which are not all expressed in one and the same frame of reference. In particular the kinematic variables are expressed in a different frame of reference from the sensor fault variables.

In an extended Kalman filter, the use is known of so-called "system" linearization points which make it possible to obtain a linear approximation of the system: at each time increment a system linearization point is used during the step of determination of the current values and another system linearization point is used during the update step.

In this invention the linearization points of the error variables are linearization points that make it possible to make changes of error variable. They will simply be referred to as "linearization points".

The error variable change used in the invention is a transfer of all the variables in one and the same frame of reference followed by the use of an invariant error. This error variable change is immediately followed by a reverse error variable change, but applied to a different linearization point. This second operation does not cancel out the preceding one since the linearization point used is different. The complete step defined as the sequence of these two operations does not exist in the prior art and improves the performance of the filter by giving it certain properties of invariant filtering. This step particularly improves the performance of the filter in the case of significant biases in the sensors.

Furthermore, the use of two error variable systems makes it possible to avoid certain numerical problems incurred by invariant filtering which appear in long-distance navigation applications.

In an embodiment the current and preceding values of the variables are defined in a reference frame of reference, the first error variable change is a change to invariant error variables in an auxiliary frame of reference known with respect to the reference frame of reference, the second error variable change is a change from invariant error variables in the auxiliary frame of reference known with respect to the reference frame of reference. The auxiliary frame of reference can be coincident or non-coincident with the reference frame of reference.

In an embodiment the first linearization point is determined based on the current values before the update, and the second linearization point is determined based on the current values after the update.

In an embodiment the first linearization point is a system linearization point used during the update step and the second linearization point is a system linearization point used during the step of determination of the current values of the following time.

In an embodiment a product is determined of a first transformation matrix making the first transformation and of a second transformation matrix making the second transformation, and the first transformation and the second transformation are made jointly using the product.

In an embodiment, the variables comprise:
an orientation of the navigation device,
a velocity of the navigation device,
a position of the navigation device and
a fault on a sensor of the navigation device, a current value of which is a vector or a current fault matrix,
the first error variable change is a change of the error variables of:
a current value of the orientation,
a current value of the velocity,
a current value of the position and
the vector or the current fault matrix,
to invariant error variables, in an auxiliary frame of reference known with respect to a reference frame of reference.

In an embodiment the variables comprise:
an orientation of the navigation device, a current value of which is a current orientation matrix and a preceding value of which is a preceding orientation matrix,
a velocity of the navigation device, a current value of which is a current velocity vector and a preceding value of which is a preceding velocity vector,
a position of the navigation device, a current value of which is a current position vector and a preceding value of which is a preceding position vector and
a fault on a sensor of the navigation device, a current value of which is a current fault vector and a preceding value of which is a preceding fault vector,
the current uncertainty matrix being representative of an uncertainty on the current orientation matrix, on the current velocity vector, on the current position vector, and on the current sensor fault vector;
the preceding uncertainty matrix being representative of an uncertainty on the preceding orientation matrix, on the preceding velocity vector, on the preceding position vector and on the preceding sensor fault vector.

In an embodiment, the current values are associated with a current time and the preceding values are associated with a preceding time, the determination of the current values comprising:
the determination of the current velocity vector by addition, to the preceding velocity vector, of an integration, over a time interval between the preceding time and the current time, of a sum of a specific force of the navigation device where applicable corrected using the estimated values of the sensor faults and a model of a terrestrial gravity experienced by the navigation device,
the determination of the current position vector by addition, to the preceding position vector, of an integration, over the time interval, of the preceding velocity vector,
the determination of the current orientation matrix by multiplication of the preceding orientation matrix by a matrix representative of a rotation of the navigation device where applicable corrected using the estimated values of the sensor faults, and/or
the determination of the current uncertainty matrix based on the preceding uncertainty matrix.

Thus in this embodiment if the sensor fault is an accelerometer bias vector, the specific force which is used to compute the current velocity vector is corrected to take into account the estimated values of the sensor faults. Similarly, if the matrix representative of a rotation of the navigation device is corrected to take into account the estimated values of the sensor faults.

In an embodiment, the measurement is a measurement, made in a mobile frame of reference attached to the navigation device, of the velocity of the navigation device with respect to a reference frame of reference, and the determination of the correction comprises:
- the subtraction, from the measurement of the velocity, of a multiplication of the transpose of the current orientation matrix and of the current velocity vector, and
- the multiplication of the subtraction by a gain matrix.

In an embodiment, the correction is a correction vector, and the updating comprises:
- a sub-step of updating of the current orientation matrix by multiplication of the current orientation matrix and of a rotation matrix associated with a rotation vector which constitutes a first part of the correction vector,
- a sub-step of updating of the current velocity vector by addition, to the current velocity vector, of a multiplication of the current orientation matrix and of a second part of the correction vector, and/or
- a sub-step of updating of the current position vector by addition, to the current position vector, of a multiplication of the current position vector by a third part of the correction vector, and/or
- a sub-step of updating of the current sensor fault vector by addition, to the current sensor fault vector, of a fourth part of the correction vector.

In an embodiment, the current values are first current values, the preceding values are first preceding values, the correction is a first correction, the measurement is a first measurement, the gain matrix is a first gain matrix, the uncertainty matrix is a first uncertainty matrix, and the modified uncertainty matrix is a first modified uncertainty matrix. The method further comprises:
- the determination of second current values of the variables and of a second current uncertainty matrix representative of an uncertainty on the second current values, based on second preceding values of the variables and on a second preceding uncertainty matrix representative of an uncertainty on the second preceding values,
- the determination of a second correction based on:
  - the second current values,
  - the second current uncertainty matrix and
  - a second measurement where applicable identical to the first measurement,
- updating of the second current values and of the second current uncertainty matrix based on the second correction and on the second current uncertainty matrix,
- a first transformation of the second uncertainty matrix to obtain a second modified uncertainty matrix, the first transformation being a first error variable change according to a third linearization point and
- a second transformation of the second modified uncertainty matrix, the second transformation being a second error variable change according to a fourth linearization point, the third linearization point being different from the fourth linearization point.

In an embodiment, the method further comprises the determination of consolidated values of the variables, based on the first current values and on the second current values.

In an embodiment, the determination of respective consolidated values of the variables comprises the determination of a similarity or of a deviation between the first corrected values and the second corrected values and, when the similarity is greater than a similarity threshold or when the deviation is less than a deviation threshold, the determination of respective consolidated values of the variables also comprises an averaging of the first corrected values and of the second corrected values or a weighted averaging of the first corrected values and of the second corrected values or the selection of the first corrected values or of the second corrected values.

In an embodiment, the determination of respective consolidated values of the kinematic variables comprises the determination of a first deviation between the first corrected values and the first measurements, the determination of a second deviation between the second corrected values and the second measurements and the selection of the first corrected values when the first deviation is less than the second deviation or of the second corrected values when the first deviation is greater than the second deviation.

In other words in this embodiment, the determining of respective consolidated values of the variables comprises the determination of an indicator of deviation from the measurements of the first values and an indicator of deviation from the measurements of the second values. The determination comprises the selection of the values having the lowest indicator of deviation from the measurements.

In an embodiment a current value of a variable representing the environment of the navigation device is determined based on a preceding value of the variable representing the environment of the navigation device.

Another aspect of the invention relates to a navigation device comprising a processing unit, three accelerometers, three gyroscopes and a measurement device, for example measuring a velocity of the navigation device. The processing unit is configured to implement the method of navigation assistance.

Another aspect of the invention relates to a computer program product comprising program code instructions for execution of the steps of the method of navigation assistance.

DESCRIPTION OF THE FIGURES

Other features and advantages of the invention will become further apparent from the following description, which is purely illustrative and non-limiting and must be read with reference to the appended figures wherein:
FIG. 1 shows a navigation device of the invention,
FIG. 2 shows an embodiment of the navigation method of the invention,
FIG. 3 shows a second embodiment of the navigation method of the invention, and
FIG. 4 shows, in another way, the second embodiment of the navigation method of the invention.

DETAILED DESCRIPTION OF THE INVENTION

FIG. 1 schematically represents a navigation device DISP. This navigation device DISP comprises a processing unit UNIT. This processing unit UNIT comprises a processor or a general-use or specialized microcontroller and a memory.

The processor or microcontroller can be an Application-Specific Integrated Circuit (ASIC). It can also be a programmable logic controller or a Field-Programmable Gate Array (FPGA).

The memory can be fixed or removable and include different memory units which can include a combination of units allowing for volatile and non-volatile storage. The memory is configured to store a software code usable by the processor or microcontroller, to perform a method of determination of respective values of kinematic variables of the navigation device DISP.

The values of the kinematic variables allow the location of the navigation device DISP and thus the navigation of the bearer of this device.

The navigation device DISP also comprises
three accelerometers 101-a to 101-c and
trois gyroscopes 102-a to 102-c.

In addition the navigation device DISP can where applicable comprise a device 103 for measurement of a position of the navigation device DISP.

The navigation device DISP can also include other devices for measurement of a kinematic variable or a combination of several kinematic variables or additional variables also estimated by the Kalman filter of the navigation device DISP.

In addition, the navigation device DISP can also include a device 104 for measurement of a distance travelled by the bearer of the navigation device DISP. This measurement device 104 is for example an odometer 104.

The three accelerometers 101-a to 101-c are able to deliver specific force data. The three accelerometers are respectively associated with three axes which can be mutually orthogonal.

The three gyroscopes 102-a to 102-c are able to deliver angular velocity data. The three gyroscopes are respectively associated with three axes which can be mutually orthogonal.

The sensor faults can for example be constant biases or biases proportional to a known electrical signal sent to the inertial sensors. In the case of biases proportional to an electrical signal it is advantageous to send the same signal to the three accelerometers and/or to the three gyroscopes.

More precisely, the accelerometers measure a specific force $f_n$ of the navigation device DISP and the gyroscopes measure an angular velocity of the navigation device DISP. This angular velocity is then transformed into a rotation matrix $\Omega_n$ representative of the rotation of the device. The time interval between two measurements is denoted dt.

In an embodiment the specific force $f_n$ is corrected/modified using the estimated values of the sensor faults.

In an embodiment the rotation matrix $\Omega_n$, representative of the rotation of the device is corrected/modified using the estimated values of the sensor faults.

The accelerometers and gyroscopes can provide either specific forces and angular velocities, or directly provide variations in velocity and angle.

The device 103 for measurement of a position of the navigation device DISP is for example:
a satellite navigation receiver, such as a receiver of GPS (Global Positioning System) type or a receiver of Galileo type,
a device making a triangulation using landmarks, the position of which is known or
a Light Detection And Ranging (LIDAR) device for remote detection of a set of known landmarks used to compute the position of the vehicle.

If the device 103 for measurement of a position is not co-located with the navigation device DISP, the distance between the measurement device 103 and the navigation device DISP is considered as a fault of the sensor. This fault of the sensor can be known or estimated at the time of implementation of the method of the invention.

The data delivered by the three accelerometers 101-a to 101-c, by the three gyroscopes 102-a to 102-c, and where applicable by the device 103 for measurement of a position and by the odometer 104 are received by the processing unit UNIT.

The processing unit UNIT is configured by the implementation of the navigation device via the determination of respective values of variables of the navigation device DISP. This method is shown in FIG. 2. It allows the location of the navigation device DISP and therefore the navigation of the bearer of this device.

These variables comprise kinematic variables which are, for example, a position, a velocity or an orientation matrix of the device representing the change in coordinates from a mobile frame of reference attached to the bearer to a reference frame of reference.

These variables also comprise sensor fault variables, the value of which is representative of faults in the measurement of one or more sensors (for example a bias of the accelerometer or of the gyroscope).

In the whole document it is considered that:
The mobile frame of reference is attached to the bearer, thus knowing this frame of reference implies knowing the orientation of the bearer.
The reference frame of reference, considered as fixed, is that in which one wishes to know the coordinates of the bearer. It is generally a terrestrial, inertial or geographical frame of reference.
The auxiliary frame of reference is that used to write the invariant error variables at the time of the update. This frame of reference is known with respect to the reference frame of reference and can be regularly moved to bring it closer to the estimated position of the bearer.

The method of FIG. 2 comprises the following steps:
capture 201 of a priori values of kinematic variables of the navigation device and a priori values of variables of faults on one of the sensors of the navigation device DISP (this latter a priori value advantageously having a value of zero),
determination 202 of respective current values of the kinematic variables of the navigation device DISP, respective current values of the sensor fault variables and a current uncertainty matrix representative of an uncertainty on the respective current values of the kinematic variables and of the sensor fault variables, based on respective preceding values of the kinematic variables, on respective preceding values of the sensor fault variables and on a preceding uncertainty matrix representative of an uncertainty on the respective preceding values of the kinematic variables and on the sensor fault variables,
determination 203 of a correction based on:
respective current values of the kinematic variables and a measurement, for example a measurement of one of the kinematic variables or of one of the sensor fault variables,
an uncertainty matrix and
a gain matrix, the gain matrix being determined based on the uncertainty matrix,
updating 204 of the respective current values of the kinematic variables, of the sensor fault variables and of the current uncertainty matrix based on the correction,
a first transformation 205 of the updated uncertainty matrix. This first transformation 205 is a first error variable change applied to the updated uncertainty matrix. This first error variable change makes it possible to transition from a first system of error variables defined for the kinematic variables in a reference frame of reference (for example a geographical geocentric, inertial or heliocentric frame of reference) and for the sensor fault variables in a mobile frame of reference attached to the bearer, to a second system of error variables, defined as the invariant error variables in a single auxiliary frame of reference used for both the kinematic variables and the sensor faults. This auxiliary frame of reference can be moved over time (for example regularly re-placed on the estimated position of the bearer).

The error variables denote the representation of the estimation errors on the state variables of the device DISP.

Following the first error variable change, the variables of the uncertainty matrix are invariant error variables (in the sense given in the prior art section) in the auxiliary frame of reference.

There are two types of invariant error variable, defined in the prior art section as left-invariant and right-invariant. Left-invariant error variables will be chosen if the measurements are made in a fixed frame of reference and right-invariant if the measurements are made in a mobile frame of reference attached to the bearer.

The method of FIG. 2 finally comprises a second transformation 206 of the uncertainty matrix having undergone the first transformation 205. This second transformation 206 corresponds to a second error variable change, applied to the uncertainty matrix having undergone the first transformation 205. This second error variable change makes it possible to go back from the second error variable system to the first error variable system.

In an extended Kalman filter, the use is known of so-called system linearization points which make it possible to obtain a linear approximation of the system: at each time increment a linearization point is used to compute the matrix F of the step of computing the current value of the covariance matrix and another linearization point is used to compute the matrix H of the update step.

The first linearization point of the error variables of the invention must coincide with the linearization point of the system used for the computations of the update step whereas the second linearization point of the error variables of the invention must coincide with the linearization point of the system used during the step of computing the current uncertainty matrix of the following time.

In an embodiment the first linearization point is determined based on the current values before the update, and the second linearization point is determined based on the current values after the update.

Thus in this embodiment the first linearization point and the second linearization point are different.

The error variable change of a covariance matrix $P^r$ representing the uncertainty on an error variable $e^r$ is a method making it possible to obtain, using a first-order Taylor expansion of a second error variable $e^c$ with respect to the error variable $e^r$, a second covariance matrix representing the uncertainty on the second error variable $e^c$. It makes it possible, for example, to change the frame of reference of the first uncertainty on the variable. Thus, in the case where the variable is in a position in one plane, a first uncertainty on this position variable is expressed in polar coordinates having the form $$\begin{pmatrix} e_r \\ e_\theta \end{pmatrix}$$

and contains an uncertainty $e_r$ of the distance to the origin r and an uncertainty $e_\theta$ of the angle $\theta$. One may write the same uncertainty using Cartesian coordinates $$\begin{pmatrix} e_x \\ e_y \end{pmatrix}$$

using the formula for a error variable change:

$$\begin{pmatrix} e_x \\ e_y \end{pmatrix} = L_{r,\theta} \begin{pmatrix} e_r \\ e_\theta \end{pmatrix}$$

With $$L_{r,\theta} = \begin{pmatrix} \cos(\theta) & -r \cdot \sin(\theta) \\ \sin(\theta) & r \cdot \cos(\theta) \end{pmatrix}$$

where $(r, \theta)$ are the polar coordinates of the point with respect to which the uncertainty is considered. This point is also known as the linearization point of the error variable change. $L_{r,\theta}$ is therefore a error variable change, which makes it possible to transform the covariance matrix $P^r$ of the uncertainties defined in polar coordinates into a covariance matrix $P^c$ in which the uncertainties are defined in Cartesian coordinates by the following formula:

$$P^c = L_{r,\theta} P^i L_{r,\theta}^t$$

It can be seen that the new uncertainty matrix depends on the old one, but also on the coordinates $(r, \theta)$ of a linearization point.

A error variable change is therefore an operation that takes a covariance matrix, a first system of error variables, a second system of error variables and a linearization point and that returns a new covariance matrix. A different linearization point leads to a different returned matrix.

Thus, as the linearization point of the first error variable change and the linearization point of the second error variable change are different, the second error variable change does not cancel out the first error variable change.

The first error variable change can be made by a first matrix and the second error variable change can be made by a second matrix.

The first matrix and the second matrix can be determined in advance analytically, along with the product of these two matrices. Next these two matrices or the product of the two matrices can be used to make the first error variable change and the second error variable change.

The term "mobile frame of reference attached to the bearer" should be understood to mean the frame of reference aligned and centered on the device DISP. The term "auxiliary frame of reference" should be understood to mean an entirely known frame of reference used for computations, which can be fixed or moved regularly in proximity to the estimated position of the bearer, in order to avoid numerical problems. A velocity close to the estimated velocity of the bearer can also be attributed thereto.

The correction is determined by a transformation matrix or gain matrix (denoted K hereinafter). This gain matrix K is computed based on an observation matrix (hereinafter denoted H). The observation matrix H in the prior art connects, in the first order, an estimation error of the state of the system to a prediction error of the measurement. The gain matrix K uses the observation matrix H to perform the reverse operation: determining a correction of the state based on a prediction error of the measurement made.

In a Kalman filter (linear, extended or invariant) an observation is defined as a function of the state predicting the measurement of a sensor, for example a GPS receiver supplying a position observation or an odometer supplying an observation of velocity in the frame of reference of the bearer.

The kinematic variables of the device comprise:
- an orientation of the device, the value of which is a current or preceding orientation matrix T, of size 3 by 3; this orientation can also be represented by a quaternion,
- a velocity of the device, the value of which is a current or preceding velocity vector, V, of size 3, and
- a position of the device, the value of which is a current or preceding position vector X, of size 3.
- sensor fault variables, three of which will appear in the equations below: the biases of the accelerometer measurements, the biases of the gyroscope measurements, and factors leading to gyroscope biases once multiplied by known electrical signals.

In addition, an uncertainty matrix P is used, representative of an uncertainty on the kinematic variables and on the sensor fault variables. This matrix is a covariance matrix.

In the remainder of the document, variables (matrices or vectors) bearing a circumflex accent represent estimated variables, and the corresponding actual variables are written without any circumflex accent.

The method comprises the determination of the value of these variables, which are respectively denoted $\hat{T}_{n|n}$, $\hat{V}_{n|n}$ and $\hat{X}_{n|n}$ for the kinematic variables and $\hat{d}_{n|n}$, $\hat{d}_{n|n}^u$, $\hat{b}_{n|n}$ for the sensor fault variables. The method also comprises the determination of the covariance matrix $P_{n|n}$ representative of the uncertainty on the current estimate. It is also assumed that a covariance matrix $P_{0|0}$, representing the initial uncertainty is available at the beginning of the navigation.

The index n here represents the time increment and, conventionally in a Kalman filter, the index n|n represents the estimate of the value at the time n taking into account the observation made at the time n and the index n|n−1 represents the estimate of the value at the time n without taking into account the observation made at the time n.

In the invention the first system of error variables is of any kind, but to arrive at the following implementation, the following first system of variables was chosen:

$$e^T = \hat{T}^t T$$
$$e^V = \hat{T}^t(V - \hat{V})$$
$$e^X = \hat{T}^t(X - \hat{X})$$
$$e^d = d - \hat{d}$$
$$e^{d^u} = d^u - \hat{d}^u$$
$$e^b = b - \hat{b}$$

It can be seen that the error variables $e^b$, $e^d$, $e^{d^u}$ are not invariant error variables.

The determination 202 uses the following equations:

$$\hat{V}_{n|n-1} = \hat{V}_{n-1|n-1} + dt \cdot (\hat{T}_{n-1|n-1}(f_n - \hat{b}_{n|n-1}) + g_n)$$

$$\hat{X}_{n|n-1} = \hat{X}_{n-1|n-1} + dt \cdot \hat{V}_{n-1|n-1}$$

-continued
$$\hat{T}_{n|n-1} = \hat{T}_{n-1|n-1} R(dt(\omega_n - \hat{d}_{n|n-1} - U_n \hat{d}_{n|n-1}^u))$$
$$\hat{d}_{n|n-1} = \hat{d}_{n-1|n-1}$$
$$\hat{d}_{n|n-1}^u = \hat{d}_{n-1|n-1}^u$$
$$\hat{b}_{n|n-1} = \hat{b}_{n-1|n-1}$$
$$P_{n|n-1} = F_n P_{n-1|n-1} F_n^t + Q_n$$

With:

$\hat{V}_{n|n-1}$ is the current velocity vector, $\hat{V}_{n-1|n-1}$ is the preceding velocity vector, $\hat{X}_{n|n-1}$ is the current position vector, $\hat{X}_{n-1|n-1}$ is the preceding position vector, $\hat{T}_{n|n-1}$ is the current orientation matrix; thus, the current orientation matrix is computed based on the angular velocities measured by the gyroscopes modified using the estimated sensor fault variables, $\hat{T}_{n-1|n-1}$ is the preceding orientation matrix, $\hat{b}_{n-1|n-1}$ represents a vector of three preceding biases on the measurements of the three accelerometers, $\hat{b}_{n|n-1}$ represents a vector of three current biases on the measurements of the three accelerometers, $\hat{d}_{n-1|n-1}$ represents a vector of three preceding biases on the measurements of the gyroscopes, $\hat{d}_{n|n-1}$ represents a vector of three current biases on the measurements of the three gyroscopes, thus in this embodiment the vector of three current biases is obtained by copying the vector of three preceding biases.

$\hat{d}_{n-1|n-1}^u$ represents a vector containing three preceding factors, whose products with three known electrical signals $u_{n-1}^1$, $u_{n-1}^2$, $u_{n-1}^3$ form three additional biases on the measurements of the three gyroscopes, $\hat{d}_{n|n-1}^u$ represents a vector containing three current factors, whose products with three known electrical signals $u_n^1$, $u_n^2$, $u_n^3$ form three additional biases on the measurements of the three gyroscopes, $g_n$ is a model of the gravity experienced by the navigation device DISP, $f_n$ is the specific force from the accelerometers, dt is the time interval between the times n−1 and n, $\omega_n$ is the angular velocity measurement provided by the gyroscope, $$U_n = \begin{pmatrix} u_n^1 & 0 & 0 \\ 0 & u_n^2 & 0 \\ 0 & 0 & u_n^3 \end{pmatrix}$$

is a 3×3 matrix containing on its diagonal the three known electrical signals $u_n^1$, $u_n^2$, $u_n^3$ proportional to components of sensor faults, $\Omega_n = R(dt(\omega_n - \hat{d}_{n|n-1} - U_n \hat{d}_{n|n-1}^u))$ is the computed rotation between the orientation at the preceding time and the orientation at the present time, R(·) denotes the function returning a rotation matrix based on a rotation vector, $$-F_n = \begin{pmatrix} \Omega_n^t & 0_3 & 0_3 & -D_R(\hat{\omega}_n) & -D_R(\hat{\omega}_n)U_n & 0_3 \\ -dt \cdot \Omega_n^t(\hat{f}_n)_\times & \Omega_n^t & 0_3 & 0_3 & 0_3 & -dt \cdot \Omega_n^t \\ 0_3 & dt \cdot \Omega_n^t & \Omega_n^t & 0_3 & 0_3 & 0_3 \\ 0_3 & 0_3 & 0_3 & I_3 & 0_3 & 0_3 \\ 0_3 & 0_3 & 0_3 & 0_3 & I_3 & 0_3 \\ 0_3 & 0_3 & 0_3 & 0_3 & 0_3 & I_3 \end{pmatrix}$$

Where $\hat{\omega}_n = \omega_n - \hat{d}_{n|n-1} - U_n \hat{d}_{n|n-1}^u$ is the angular velocity with the estimated drifts corrected, $\hat{f}_n = f_n - \hat{b}_{n|n-1}$ is the specific force with the estimated biases corrected and $D_R(\hat{\omega}_n)$ is defined by the following Taylor expansion as $\mu : R(\hat{\omega}_n + \mu) = R(\hat{\omega}_n)R(D_R(\hat{\omega}_n)\mu) + o(\|\mu\|)$, $Q_n$ is a covariance matrix representing the uncertainty added by each step of propagation of the kinematic variables and of the sensor error variables. The main sources of this uncertainty are the inaccuracy of the measurements coming from the accelerometers and from the gyroscopes and the uncertain variation in the modeled bias vectors. The exact value to be given to $Q_n$ is determined using specifications provided by the manufacturer of the navigation device DISP, $(l)_x$ corresponds to an antisymmetric matrix made with the components of the vector l, this matrix is such that for any vector v one has $(l)_x v = l \times v$ where x is a vector product, P is a covariance matrix, in which the values of the diagonal represent the uncertainties of each variable of the state and in which the values that are not on the diagonal represent the cross-uncertainties between the variables. $P_{n-1|n-1}$ is the preceding uncertainty matrix, $P_{n|n-1}$ is the current uncertainty matrix.

In an embodiment, the step 203 of determination of a correction ds is triggered on detection of a stopping of the device DISP, and follows the following equations:

$$z_n = 0 - \hat{T}_{n|n-1}^t \hat{V}_{n|n-1}$$
$$K_n = P_{n|n-1}H_n^t(H_n P_{n|n-1} H_n^t + R_n)^{-1}$$
$$ds = K_n z_n$$

With:
ds the correction.

$R_n$ a covariance matrix used to represent the measurement errors and the non-modeled quantities. It can depend or not depend on the estimated kinematic variables, $H_n = ((\hat{T}_{n|n-1}^t \hat{V}_{n|n-1})_\times \ I_3 \ O_{3,12})$ the observation matrix making it possible to connect the velocity variations in the bearer frame of reference to the error variables of the navigation device DISP, $K_n$ is a gain matrix transforming the error on the velocity vector into a correction to be made to the other kinematic variables and $O_{3,12}$ is a zero matrix of size 3×12.

The zero appearing on the right of the "=" sign in the definition of $z_n$ is the velocity observation, which here still has a value of zero, since the additional measurement is a stop detection.

ds is a vector of size 18. The three first components $(ds_{1:3})$ correspond to the rotation error. The next three components $(ds_{4:6})$ correspond to the velocity error. The next three components $(ds_{7:9})$ correspond to the position error, the next three components $ds_{10:12}$ correspond to the gyroscope bias errors, the next three components $ds_{13:15}$ correspond to the errors of factors to be applied to the electrical signals $u_n^1$, $u_n^2$, $u_n^3$ to compute three additional biases to be applied to the three gyroscopes, and the next three components $ds_{16:18}$ correspond to the bias errors of the accelerometers.

The determination 203 of a correction makes it possible to determine the estimation error on all the kinematic variables and sensor fault variables of the navigation device based on the measurement, which is in the special case described here a measurement of the device velocity.

This determination of the deviation is done by the gain matrix $K_n$, which takes into account the uncertainties on the kinematic variables of the navigation device DISP. If there is a low uncertainty, the zero velocity measurement is taken into account weakly and, if there is a high uncertainty, the zero velocity measurement is taken into account strongly.

The update 204 uses the correction ds to produce the following equations:

$$\hat{T}_{n|n} = \hat{T}_{n|n-1} R(ds_{1:3})$$
$$\hat{V}_{n|n} = \hat{V}_{n|n-1} + \hat{T}_{n|n-1} ds_{4:6}$$
$$\hat{X}_{n|n} = \hat{X}_{n|n-1} + \hat{T}_{n|n-1} ds_{7:9}$$
$$\hat{d}_{n|n} = \hat{d}_{n|n-1} + ds_{10:12}$$
$$\hat{d}_{n|n}^u = \hat{d}_{n|n-1}^u + ds_{13:15}$$
$$\hat{b}_{n|n} = \hat{b}_{n|n-1} + ds_{16:18}$$
$$P_{n|n} = (I - K_n H_n) P_{n|n-1}$$

In another embodiment, the update uses the correction ds to produce the following modified equations:

$$\hat{T}_{n|n} = \hat{T}_{n|n-1} R(ds_{1:3})$$
$$\hat{V}_{n|n} = \hat{V}_{n|n-1} + R(ds_{1:3})V(ds_{1:3})ds_{4:6}$$
$$\hat{X}_{n|n} = \hat{X}_{n|n-1} + R(ds_{1:3})V(ds_{1:3})ds_{7:9}$$
$$\hat{d}_{n|n} = R(ds_{1:3})^t[I_3 + V(ds_{1:3})(ds_{1:3})_\times]\hat{d}_{n|n-1} + R(ds_{1:3})^t V(ds_{1:3})ds_{10:12}$$
$$\hat{d}_{n|n}^u = R(ds_{1:3})^t[I_3 + V(ds_{1:3})(ds_{1:3})_\times]\hat{d}_{n|n-1}^u + R(ds_{1:3})^t V(ds_{1:3})ds_{13:15}$$
$$\hat{b}_{n|n} = R(ds_{1:3})^t[I_3 + V(ds_{1:3})(ds_{1:3})_\times]\hat{b}_{n|n-1} + R(ds_{1:3})^t V(ds_{1:3})ds_{16:18}$$
$$P_{n|n} = (I - K_n H_n) P_{n|n-1}$$

With $V(\alpha) = I_3 + \frac{(1 - \cos(\|\alpha\|))}{\|\alpha\|^2}(\alpha)_\times + \frac{(\|\alpha\| - \sin(\|\alpha\|))}{\|\alpha\|^3}(\alpha)_\times^2$.

The first error variable change, using the pre-update state as the linearization point, and the reference frame of reference as the auxiliary frame of reference, is written:

$$P_{n|n}^+ = L_{n|n-1} P_{n|n} L_{n|n-1}^t$$

With $L_{n|n-1} = \begin{pmatrix} \hat{T}_{n|n-1} & 0_3 & 0_3 & 0_3 & 0_3 & 0_3 \\ (\hat{V}_{n|n-1})_\times \hat{T}_{n|n-1} & \hat{T}_{n|n-1} & 0_3 & 0_3 & 0_3 & 0_3 \\ (\hat{X}_{n|n-1})_\times \hat{T}_{n|n-1} & 0_3 & \hat{T}_{n|n-1} & 0_3 & 0_3 & 0_3 \\ 0_3 & 0_3 & 0_3 & \hat{T}_{n|n-1} & 0_3 & 0_3 \\ 0_3 & 0_3 & 0_3 & 0_3 & \hat{T}_{n|n-1} & 0_3 \\ 0_3 & 0_3 & 0_3 & 0_3 & 0_3 & \hat{T}_{n|n-1} \end{pmatrix}$ $L_{n|n-1}$ is a transformation matrix used to make the first error variable change.

The second error variable change, taking the post-update state as the linearization point, is written:

$$P_{n|n}^{++} = L_{n|n}^{-1} P_{n|n}^{+} (L_{n|n}^{-1})^t$$

With $$L_{n|n} = \begin{pmatrix} \hat{T}_{n|n} & 0_3 & 0_3 & 0_3 & 0_3 & 0_3 \\ (\hat{V}_{n|n})_\times \hat{T}_{n|n} & \hat{T}_{n|n} & 0_3 & 0_3 & 0_3 & 0_3 \\ (\hat{X}_{n|n})_\times \hat{T}_{n|n} & 0_3 & \hat{T}_{n|n} & 0_3 & 0_3 & 0_3 \\ 0_3 & 0_3 & 0_3 & \hat{T}_{n|n} & 0_3 & 0_3 \\ 0_3 & 0_3 & 0_3 & 0_3 & \hat{T}_{n|n} & 0_3 \\ 0_3 & 0_3 & 0_3 & 0_3 & 0_3 & \hat{T}_{n|n} \end{pmatrix}$$

$L_{n|n}$ is a transformation matrix used to make the second error variable change.

As indicated in one of the embodiments, one can also compute $L_n^{tot} = L_{n|n}^{-1} L_{n|n-1}$ and apply the two changes of error variable as a single operation:

$$P_{n|n}^{++} = L_n^{tot} P_{n|n} (L_n^{tot})^t$$

The matrix $L_n^{tot}$ is a frame of reference change matrix making it possible to jointly make the first error variable change and the second error variable change. This matrix $L_n^{tot}$ is here particularly simple:

$$L_n^{tot} =$$

$$\begin{pmatrix} R(ds_{1:3})^T & 0_{3,3} & 0_{3,3} & 0_{3,3} & 0_{3,3} & 0_{3,3} \\ -R(ds_{1:3})^T (s_{4:6})_\times & R(ds_{1:3})^T & 0_{3,3} & 0_{3,3} & 0_{3,3} & 0_{3,3} \\ -R(ds_{1:3})^T (s_{7:9})_\times & 0_{3,3} & R(ds_{1:3})^T & 0_{3,3} & 0_{3,3} & 0_{3,3} \\ 0_{3,3} & 0_{3,3} & 0_{3,3} & R(ds_{1:3})^T & 0_{3,3} & 0_{3,3} \\ 0_{3,3} & 0_{3,3} & 0_{3,3} & 0_{3,3} & R(ds_{1:3})^T & 0_{3,3} \\ 0_{3,3} & 0_{3,3} & 0_{3,3} & 0_{3,3} & 0_{3,3} & R(ds_{1:3})^T \end{pmatrix}$$

The steps 202 to 206 of the method are repeated throughout the navigation.

In particular the corrected velocity vector $\hat{V}_{n|n}$ becomes the next preceding velocity vector, the corrected position vector $\hat{X}_{n|n}$ becomes the next preceding position vector, the corrected orientation matrix $\hat{T}_{n|n}$ becomes the next preceding orientation matrix and the corrected sensor fault states $d_{n|n}$, $d_{n|n}^u$, $b_{n|n}$ become the next preceding sensor fault states.

This method thus allows the location of the navigation device DISP and therefore the navigation of the bearer of this device.

It is possible for any number of sensor fault error variables defined in the measurement frame of reference to be estimated by the method of the invention. In addition to dealing with the groups of three variables concatenated into a vector, the method can also deal with groups of nine variables representing a matrix of dimensions 3×3 denoted M but concatenated into a vector μ of size 9 for the requirements of the Kalman filtering. This vector is written using the coordinates of M in the form:

$$\mu = (M_{1,1}, M_{2,1}, M_{3,1}, M_{1,2}, M_{2,2}, M_{3,2}, M_{1,3}, M_{2,3}, M_{3,3})$$

The invariant error variables defined until now for vectors of size 3 must be adapted to the vector μ of size 9 by replacing the matrix T of transition from the mobile frame of reference to the auxiliary frame of reference by the matrix of transition from the vector μ written in the mobile frame of reference to the vector μ written in the auxiliary frame of reference. This formula is deduced from the formula for changing frame of reference $M^a = TM^m T^T$ of the matrix M which manifests on the vector μ by the formula $\mu^a = (T \otimes T)\mu^m$ where $\otimes$ denotes the Kronecker product (the matrix $T \otimes T$ is therefore of size 9×9) and where the exponents a and m denote the quantities written respectively in the auxiliary frame of reference or in the mobile frame of reference attached to the bearer. From this equation is deduced an adaptation of the left-invariant error variable in the auxiliary frame of reference, which is used in the first error variable change step of the invention and in the second error variable change step of the invention:

$$e^\mu = (\hat{T} \otimes \hat{T})^T (\mu^a - \hat{\mu}^a) = (\hat{T} \otimes \hat{T})^T (T \otimes T)\mu^m - \hat{\mu}^m$$

One can also deduce therefrom an adaptation of the right-invariant error variable in the auxiliary frame of reference, which can also be used in the first and in the second error variable change step of the invention:

$$e^\mu = \mu^a - (T \otimes T)(\hat{T} \otimes \hat{T})^T \hat{\mu}^a = (T \otimes T)(\mu^m - \hat{\mu}^m)$$

In the implementation described above if such a vector μ is added after the other estimated quantities one deduces from these adapted error variables an adaptation to be made to the matrix $L_n^{tot}$ which becomes a matrix $L_n^{tot\prime}$ defined based on $L_n^{tot}$ by the addition of an additional block of size 9×9 associated with the vector μ:

$$L_n^{tot\prime} = \begin{pmatrix} L_n^{tot} & 0_{18,9} \\ 0_{9,18} & R(ds_{1:3})^T \otimes R(ds_{1:3})^T \end{pmatrix}$$

It is also possible that parameters (contained in a vector $C^r$) describing the environment of the vehicle in the reference frame of reference are estimated at the same time as the other variables. If these parameters are grouped into vectors of size 3 one can associate invariant error variables therewith and follow the steps of the invention, but these parameters can be more complicated and for example describe a magnetic field or a field of velocity vectors of the wind or of the current covering the entire space. The invention is still applicable, but the frame of reference change rotation T appearing in the invariant errors and transitioning from the coordinates in the mobile frame of reference attached to the bearer to the coordinates in the auxiliary frame of reference must be replaced by a frame of reference change operation $\phi_{T, V, X}$ transitioning from the parameters $C^m$ of the environment in a mobile frame of reference attached to the bearer to the parameters $C^a$ of the environment in an auxiliary frame of reference. One deduces therefrom an adaptation of the left-invariant error variable in the auxiliary frame of reference, which is used in the first error variable change step of the invention and in the second error variable change step of the invention:

$$e^C = \phi_{\hat{T},\hat{V},\hat{X}}^{-1}(C^a - \hat{C}^a)$$

Where the exponent −1 denotes the reciprocal transformation. One also deduces therefrom an adaptation of the right-invariant error variable in the auxiliary frame of reference, that can also be used in the first and in the second error variable change step of the invention:

$$e^C = C^a - \phi_{\hat{T},\hat{V},\hat{X}} \circ \phi_{\hat{T},\hat{V},\hat{X}}^{-1} \hat{C}^a$$

Where the exponent −1 denotes the reciprocal transformation and the symbol ∘ denotes the composition of two transformations.

For example, the environment can be a magnetic field B defined at any point $P^a$ of the auxiliary frame of reference by a formula of the form $B^a(P^a) = C_0^a + C_1^a P^a$: the parameters describing this environment are then the vector $C_0^a$ of size 3 and the matrix $C_1$ of size 3×3. The same field is written in the mobile frame of reference attached to the bearer by the formula $B^m(P^m) = C_0^m + C_0^m P^m$ with $C_0^a = TC_0^m - TC_1^m T^T x^a$ and $C_1^a = TC_1^m T^T$. The frame of reference change transformation of the coordinates of the field is then:

$$\phi_{T,V,X}(C_0, C_1) = (TC_0 - TC_1 T^T X, TC_1 T^T)$$

This variable change makes it possible to obtain the invariant error variables that constitute the second set of error variables and therefore to implement the invention. In particular, if one wishes to complete the implementation already described by the estimation of the parameters $C^r$ of a magnetic field written in the reference frame of reference here colinear with the auxiliary frame of reference using the error variable $C^r - \hat{C}^r$ in the first set of error variables and the invariant error variable $e_c = C^r - \phi_{T,V,X} \circ \phi_{\hat{T},\hat{V},\hat{X}}^{-1} \hat{C}^r$ in the second set of error variables the adaption of the propagation and update steps is conventional but the matrix $L_n^{tot}$ of the invention is increased into a matrix $L_n^{tot'}$:

$$L_n^{tot'} = \begin{pmatrix} L_n^{tot} & 0_{18,c} \\ \left[ D\phi_{\hat{C}_{n|n}^r} \; -D\phi_{\hat{C}_{n|n-1}^r} \right] Ad_{n|n-1} & 0_{c,9} & I_{c,c} \end{pmatrix}$$

Where c is the dimension of the vector $C^r$ of the parameters of the magnetic field and $D\phi_c$ is a matrix of size 9×c defined by the following Taylor expansion:

$$\phi_{R(\xi),dv,dx}(C) = D\phi_C \begin{pmatrix} \xi \\ dv \\ dx \end{pmatrix} + \circ \begin{pmatrix} \xi \\ dv \\ dx \end{pmatrix}$$

And $Ad_{n|n}$ and $Ad_{n|n-1}$ are defined by the formulae:

$$Ad_{n|n} = \begin{pmatrix} T_{n|n} & 0_{3,3} & 0_{3,3} \\ (\hat{V}_{n|n})_\times T_{n|n} & T_{n|n} & 0_{3,3} \\ (\hat{X}_{n|n})_\times T_{n|n} & 0_{3,3} & T_{n|n} \end{pmatrix}, Ad_{n|n-1} = \begin{pmatrix} T_{n|n-1} & 0_{3,3} & 0_{3,3} \\ (\hat{V}_{n|n-1})_\times T_{n|n-1} & T_{n|n-1} & 0_{3,3} \\ (\hat{X}_{n|n-1})_\times T_{n|n-1} & 0_{3,3} & T_{n|n-1} \end{pmatrix}$$

Here the environment described by the parameters of C is a magnetic field but it can, for example, be a binary function taking the value 1 for locations occupied by an object and 0 for empty locations, or taking a value related to a color observed at the location in question.

When the faults of a group of sensors are defined as the scalar products of two-dimensional vectors to be estimated and of known and potentially time-variant vectors, the first error variable change can be preceded by the application of the plane by a different angle for each sensor of the group and the second variable change can be followed by a reverse rotation. The angle of this rotation is the average angle between the known vector associated with this sensor and the vector associated with one of the sensors of the group chosen as the angular reference.

FIG. 3 shows another embodiment of the method of determination of respective values of kinematic variables of the navigation device DISP and sensor fault variables. In this embodiment, the steps 202 to 206 are doubled into two branches and carried out in parallel. Next, at different times, the estimates of two branches are fused in a fusion step 401 (shown in FIG. 4). FIG. 4 shows, in another way, this embodiment. At each time one extracts the estimates of the two branches, which are combined to provide a consolidated estimate but this estimate will never return into the branches. It is only provided as an output. Thus, the branches remain independent from the beginning to the end.

As shown in FIG. 4, the steps 202-a to 206-a form the steps of the first branch. The steps 202-b to 206-b are the steps of the second branch.

More precisely, FIG. 3 is a special case of the method shown in FIG. 4.

In this embodiment the method of assistance with the navigation of a vehicle comprises the following steps:

determination 202-a of first current values of the variables and of a first current uncertainty matrix representative of an uncertainty on the first current values, based on first preceding values of the variables and on a first preceding uncertainty matrix, determination 203-a of a first correction based on:

first current values of the variables, the first current orientation matrix and a first measurement, updating 204-a of the first current values and of the first current uncertainty matrix based on the first correction and on the first current uncertainty matrix, first transformation 205-a of the first current uncertainty matrix to obtain a first modified uncertainty matrix, this first transformation 205-a is a first change of variable according to a first linearization point, and second transformation 206-a of the first modified uncertainty matrix, the second transformation 206-a is a first error variable change according to a second linearization point, the first linearization point being different from the second linearization point.

The method further comprises:

the determination 202-b of respective second current values of a navigation device DISP and of a second current uncertainty matrix representative of an uncertainty on the respective second current values of the variables, based on respective second preceding values of the variables and on a second preceding uncertainty matrix representative of an uncertainty on the respective second preceding values of the variables, the determination 203-b of a second correction based on:
respective second current values of the variables,
the second current uncertainty matrix and
a second measurement which is where applicable identical to the first measurement, the updating 204-b of the respective second current values of the variables and of the second current uncertainty matrix based on the second correction and on the second current uncertainty matrix, a first transformation 205-b of the second uncertainty matrix to obtain a second modified uncertainty matrix, the first transformation 205-b being a first error variable change according to a third linearization point, a second transformation 206-b of the second modified uncertainty matrix, the second transformation 206-b is a error variable change according to a fourth linearization point, the third linearization point being different from the fourth linearization point.

The fusion step 401 then makes it possible to advantageously obtain a single estimate of the system state. It is also possible to have N different branches identified by an integer i. In this case, each branch i is accompanied by an indicator of deviation from the measurements $s_n^i$ (where n denotes a time increment). This indicator of deviation from the measurements is used by the fusion step 401.

This indicator can, for example, be initialized to zero and updated as follows at each time n:

$$s_n^i = s_{n-1}^i + (z_n^i)^T (S_n)^{-1} z_n^i$$

Where $z_n^i$ is the so-called "innovation" vector appearing in the equations of the branch i and $S_n^i = H_n^i PP_{n|n-1}^i (H_n^i)^T + R_n^i$ is the so-called "innovation covariance" matrix constructed from the matrices $H_n^i$, $PP_{n|n-1}^i$, $R_n^i$ also appearing in the equations of the branch i.

In an embodiment, the fusion step 401 makes it possible to select the best branch, which will be the branch i associated with the weakest indicator $s_n^i$.

In an embodiment, the fusion step 401 can take a weighted average of the states returned by the different branches i, the weights $p_n^i$ used being a function of the indicators of deviation from the measurements $s_n^i$. They can, for example, be computed by the following formula:

$$p_n^i = \frac{\exp(-s_n^i)}{\Sigma_j \exp(-s_n^j)}$$

This embodiment is particularly beneficial when the initial orientation of the bearer is unknown. In this case each branch is implemented with a different initialization.

The step 401 can also implement a statistical test verifying the similarity or consistency of the two estimators, to obtain an estimator of better integrity than a conventional Kalman filter. The likelihood test uses the matrix $P_{n|n}'$ from the branch a and $P_{n|n}''$ from the branch b and verifies the following relationships $p(\Delta s''|0, P_{n|n}'') > \alpha$ and $p(\Delta s'|0, P_{n|n}') > \alpha$ where $\Delta s'$ (resp. $\Delta s''$) is a vector representative of the deviation between the two navigation states from the branches a and b expressed in the same system of error variables as P' (resp. P''), p(s|0, P) is the density of the multivariate normal law centered on the covariance matrix P, evaluated at the point s, and $\alpha$ is a previously set threshold. The deviation $\Delta s$ can be, for example, the characteristic logarithmic error of the invariant filtering. This test can be summarized by saying that it verifies that each estimate grants a high probability to the other estimate.

Another possible test consists in computing a deviation between the two normal laws returned by the two filters, this deviation being for example the Kullback-Leibler divergence defined by the formula:

$$\frac{1}{2}\left(tr(P'^{-1}\tilde{P}'') + \Delta s'^T P'^{-1} \Delta s' - k - \ln\left(\frac{\det(P')}{\det(\tilde{P}'')}\right)\right)$$

Where tr( ) is the trace function, k is the dimension of the state of the system (k=18 if the orientations, velocities and positions are estimated as well as the two types of gyroscope bias and the biases of the accelerometers), ln( ) denotes the logarithm function, det( ) the determinant function, $\tilde{P}''$ is the matrix P'' written in the same coordinate system as P' (the two Kalman filters of the branches a and b can represent their errors in different systems of error variables). Alternatively, the roles of P' and P'' can be switched:

$$\frac{1}{2}\left(tr(P''^{-1}\tilde{P}') + \Delta s''^T P''^{-1} \Delta s'' - k - \ln\left(\frac{\det(P'')}{\det(\tilde{P}')}\right)\right)$$

The test will be positive if the deviation thus defined remains below a previously set threshold.

If the test is positive, the estimate of one of the two branches is returned. It is also possible to return the average of the variables estimated by the two branches. Another possibility is to start from the state s' and define a correction $\delta s' = P'[P' + \tilde{P}'']^{-1} \Delta s'$ that will be made to s' by the same formulae as the correction ds' of the update step.

Symmetrically, it is possible to start from the state ds'' and define a correction $\delta s'' = P''[P'' + \tilde{P}']^{-1} \Delta s''$ that will be made to s'' by the same formulae as the correction ds'' of the update step.

This embodiment is particularly beneficial if auxiliary measurements are taken by different sensors in different frame of references (for example a GPS receiver providing a position measurement in a terrestrial frame of reference and an odometer providing a velocity measurement in a mobile frame of reference attached to the bearer). In this case each of the two branches will only use the measurements coming from a single sensor and the systems of error variables involved in the invention may be different for the different branches.

In alternative embodiments the linearization points of the extended Kalman filter improved by the invention may be chosen in advance, from another filter, from a consolidated estimate based on several filters, obtained by modifying the value of the estimated state (for example by correcting its altitude while retaining its latitude, its longitude and the other estimated variables) or constructed in any other way based on the variables estimated by the invention.

The invention claimed is:

1. A method of assistance with the navigation of a vehicle comprising the following steps:
    capturing a priori values of variables of a device for navigation of the vehicle,
    determining current values of the variables and determining a current uncertainty matrix, based on preceding values of the variables and on a preceding uncertainty matrix,
    determining a correction based on:
    the current values of the variables,
    the current uncertainty matrix and
    a measurement,
    updating the current values and of the current uncertainty matrix based on the correction and on the current uncertainty matrix,
    carrying out a first transformation of the current uncertainty matrix to obtain a modified uncertainty matrix, the first transformation being a first error variable change according to a first linearization point, and
    carrying out a second transformation of the modified uncertainty matrix, the second transformation being a second error variable change according to a second linearization point, the first linearization point being different from the second linearization point,
the first transformation being not cancelled out by the second transformation since the first linearization point is different from the second linearization point, such that a sequence of the first transformation and the second transformation improves a performance of the assistance method.

2. The method as claimed in claim 1, wherein the current and preceding values of the variables are defined in a reference frame of reference,
    the first error variable change is a change to invariant error variables in an auxiliary frame of reference known with respect to the reference frame of reference,
    the second error variable change is a change from invariant error variables in the auxiliary frame of reference known with respect to the reference frame of reference.

3. The method as claimed in claim 1, wherein the first linearization point is determined based on the current values before the update, and the second linearization point is determined based on the current values after the update.

4. The method as claimed in claim 1, wherein the first linearization point is a system linearization point used during the update step and the second linearization point is a system linearization point used during the step of determination of the current values of the following time.

5. The method as claimed in claim 1, wherein a product is determined of a first transformation matrix making the first transformation and of a second transformation matrix making the second transformation,
    and the first transformation and the second transformation are made jointly using the product.

6. The method as claimed in claim 1, the variables comprising:
    an orientation of the navigation device,
    a velocity of the navigation device,
    a position of the navigation device and
    a fault on a sensor of the navigation device, a current value of which is a vector or a current fault matrix,
the first error variable change is a change of the error variables of:
    a current value of the orientation,
    a current value of the velocity,
    a current value of the position and
    the vector or the current fault matrix,
to invariant error variables, in an auxiliary frame of reference known with respect to a reference frame of reference.

7. The method as claimed in claim 1, the variables comprising:
    an orientation of the navigation device, a current value of which is a current orientation matrix and a preceding value of which is a preceding orientation matrix,
    a velocity of the navigation device, a current value of which is a current velocity vector and a preceding value of which is a preceding velocity vector,
    a position of the navigation device, a current value of which is a current position vector and a preceding value of which is a preceding position vector and
    a fault on a sensor of the navigation device, a current value of which is a current fault vector and a preceding value of which is a preceding fault vector,
the current uncertainty matrix being representative of an uncertainty on the current orientation matrix, on the current velocity vector, on the current position vector, and on the current sensor fault variables, and
the preceding uncertainty matrix being representative of an uncertainty on the preceding orientation matrix, on the preceding velocity vector, on the preceding position vector and on the preceding sensor fault variables.

8. The method as claimed in claim 7, the current values being associated with a current time and the preceding values are associated with a preceding time, determining the current values comprising:
    determining the current velocity vector by addition, to the preceding velocity vector, of an integration, over a time interval between the preceding time and the current time, of a sum of a specific force of the navigation device where applicable corrected using the estimated values of the sensor faults, and on a model of a terrestrial gravity experienced by the navigation device,
    determining the current position vector by addition, to the preceding position vector, of an integration, over the time interval, of the preceding velocity vector,
    determining the current orientation matrix by multiplication of the preceding orientation matrix by a matrix representative of a rotation of the navigation device where applicable corrected using the estimated values of the sensor faults, and/or
    determining the current uncertainty matrix based on the preceding uncertainty matrix.

9. The method as claimed in claim 7, the measurement being a measurement of the velocity of the navigation device, determining the correction comprising:
    subtracting, from the measurement of the velocity, of a multiplication of the transpose of the current orientation matrix and of the current velocity vector, and
    multiplying the subtraction by a gain matrix.

10. The method as claimed in claim 7, the correction being a correction vector, the updating comprising:
    a sub-step of updating of the current orientation matrix by multiplication of the current orientation matrix and of a rotation matrix associated with a rotation vector which constitutes a first part of the correction vector,
    a sub-step of updating of the current velocity vector by addition, to the current velocity vector, of a multiplication of the current orientation matrix and of a second part of the correction vector, and/or
    a sub-step of updating of the current position vector by addition, to the current position vector, of a multiplication of the current position vector by a third part of the correction vector, and/or a sub-step of updating of the current sensor fault vectors by addition of a fourth part of the correction vector.

11. The method as claimed in claim 7,
the current values being first current values,
the preceding values being first preceding values,
the correction being a first correction,
the measurement being a first measurement,
the gain matrix being a first gain matrix,
the uncertainty matrix being a first uncertainty matrix,
the modified uncertainty matrix being a first modified uncertainty matrix,
the method further comprising:
  determining second current values of the variables and second current uncertainty matrix representative of an uncertainty on the second current values, based on second preceding values of the kinematic variables and on a second preceding uncertainty matrix representative of an uncertainty on the second preceding values,
  determining a second correction based on:
  the second current values,
  the second current uncertainty matrix and
  a second measurement,
  updating the second current values and the second current uncertainty matrix based on the second correction and on the second current uncertainty matrix,
  carrying out a first transformation of the second uncertainty matrix to obtain a second modified uncertainty matrix, the first transformation being a first error variable change according to a third linearization point,
  carrying out a second transformation of the second modified uncertainty matrix, the second transformation being a second error variable change according to a fourth linearization point, the third linearization point being different from the fourth linearization point.

12. The method as claimed in claim 11, further comprising determining consolidated values of the kinematic variables, based on the first current values and on the second current values.

13. The method as claimed in claim 12, determining respective consolidated values of the kinematic variables comprising determining a similarity or a deviation between the first corrected values and the second corrected values and, when the similarity is greater than a similarity threshold or when the deviation is less than a deviation threshold, determining respective consolidated values of the kinematic variables also comprising:
  an averaging of the first corrected values and of the second corrected values or
  a weighted averaging of the first corrected values and of the second corrected values or
  the selection of the first corrected values or of the second corrected values.

14. The method as claimed in claim 12, determining respective consolidated values of the kinematic variables comprising:
  determining a first deviation between the first corrected values and the first measurements,
  determining a second deviation between the second corrected values and the second measurements and
  selecting the first corrected values when the first deviation is less than the second deviation or the second corrected values when the first deviation is greater than the second deviation.

15. The method as claimed in claim 1, wherein a current value of a variable representing the environment of the navigation device is determined based on a preceding value of the variable representing the environment of the navigation device.

16. A navigation device comprising:
  a processing unit,
  three accelerometers,
  three gyroscopes and
  a measurement device for example measuring a velocity of the navigation device,
the processing unit configured to implement the method of navigation assistance as claimed in claim 1.

17. A computer program product comprising program code instructions for execution of the steps of the method of navigation assistance, as claimed in claim 1, when the latter is executed by a processor.

* * * * *